United States Patent
Haug et al.

(10) Patent No.: US 10,015,277 B2
(45) Date of Patent: Jul. 3, 2018

(54) COMMUNICATION METHOD FOR TRANSMITTING USEFUL DATA AND CORRESPONDING COMMUNICATION SYSTEM

(71) Applicant: Robert Bosch GmbH, Stuttgart (DE)

(72) Inventors: Matthias Haug, Renningen (DE); Joerg Moennich, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 240 days.

(21) Appl. No.: 14/784,532

(22) PCT Filed: Mar. 18, 2014

(86) PCT No.: PCT/EP2014/055359
§ 371 (c)(1),
(2) Date: Oct. 14, 2015

(87) PCT Pub. No.: WO2014/170077
PCT Pub. Date: Oct. 23, 2014

(65) Prior Publication Data
US 2016/0050291 A1   Feb. 18, 2016

(30) Foreign Application Priority Data
Apr. 15, 2013   (DE) .......................... 10 2013 206 661

(51) Int. Cl.
*H04L 29/08* (2006.01)
*H04W 12/04* (2009.01)
(Continued)

(52) U.S. Cl.
CPC ............ *H04L 67/32* (2013.01); *H04L 67/104* (2013.01); *H04L 67/12* (2013.01); *H04W 12/04* (2013.01);
(Continued)

(58) Field of Classification Search
CPC ...................................................... H04L 67/32
See application file for complete search history.

(56) References Cited

U.S. PATENT DOCUMENTS 661,755 A * 11/1900 Cheheyl ................ A47B 57/42
                                                        248/243
755,211 A *  3/1904 Boring ..................... E05D 3/02
                                                         16/387
(Continued)

FOREIGN PATENT DOCUMENTS

DE   102009054795          9/2010
DE   102009054795 A1 *    9/2010    ............. G08G 1/161
(Continued)

OTHER PUBLICATIONS

Mullins, "Exploring the anatomy of a data packet", 2001.*
(Continued)

*Primary Examiner* — O. C. Vostal
(74) *Attorney, Agent, or Firm* — Norton Rose Fulbright US LLP; Gerard Messina

(57) ABSTRACT

A communication method is provided for transmitting useful data between a first traffic participant, at least one second traffic participant, and a central communication device. It is provided that the first traffic participant provides a data packet and transmits it to the central communication device, the data packet being assigned to a changing key that is transmitted together with the data packet, and that the first traffic participant transmits an identifier together with the key to the second traffic participant, and that the second traffic participant requests from the central communication device, using the key, the data packet assigned thereto, and assigns it to the first traffic participant. Also provided is a communication system.

11 Claims, 1 Drawing Sheet

(51) Int. Cl.
*H04L 29/06* (2006.01)
*G08G 1/0967* (2006.01)
*H04W 84/00* (2009.01)
*H04W 4/04* (2009.01)

(52) U.S. Cl.
CPC . *G08G 1/096775* (2013.01); *G08G 1/096791* (2013.01); *H04L 63/061* (2013.01); *H04L 63/062* (2013.01); *H04L 63/068* (2013.01); *H04L 63/18* (2013.01); *H04W 4/046* (2013.01); *H04W 84/005* (2013.01)

(56) References Cited

U.S. PATENT DOCUMENTS

| | | | | |
|---|---|---|---|---|
| 5,646,982 A * | 7/1997 | Hogan | H04M 3/533 | 379/79 |
| 5,660,246 A * | 8/1997 | Kaman | B60R 25/20 | 180/287 |
| 5,668,880 A * | 9/1997 | Alajajian | H04B 1/707 | 370/335 |
| 5,729,537 A * | 3/1998 | Billstrom | G06Q 20/383 | 340/5.8 |
| 6,101,388 A * | 8/2000 | Keshavachar | H04W 60/04 | 455/435.1 |
| 6,266,608 B1 * | 7/2001 | Pertz | G08G 1/096716 | 340/901 |
| 6,307,837 B1 * | 10/2001 | Ichikawa | H04L 63/0236 | 370/230 |
| 6,430,164 B1 * | 8/2002 | Jones | H04L 29/06 | 370/313 |
| 6,577,946 B2 * | 6/2003 | Myr | G08G 1/0104 | 455/456.5 |
| 6,625,152 B1 * | 9/2003 | Monsen | H04L 29/06 | 370/218 |
| 6,810,817 B1 * | 11/2004 | James | B61B 13/04 | 104/88.02 |
| 7,206,294 B2 * | 4/2007 | Garahi | H04W 88/02 | 370/315 |
| 7,353,388 B1 * | 4/2008 | Gilman | H04L 63/06 | 713/168 |
| 7,437,553 B2 * | 10/2008 | Alten | H04L 63/0428 | 380/279 |
| 7,587,485 B1 * | 9/2009 | Chitnis | H04L 43/022 | 709/224 |
| 7,797,995 B2 * | 9/2010 | Schafer | B60C 11/24 | 73/146 |
| 7,895,445 B1 * | 2/2011 | Albanese | G06F 21/335 | 713/172 |
| 8,004,971 B1 * | 8/2011 | Szabo | H04L 12/4625 | 370/230 |
| 8,014,936 B2 * | 9/2011 | Chapman | G08G 1/0104 | 701/117 |
| 8,352,741 B2 * | 1/2013 | Simon | H04L 9/0836 | 709/225 |
| 8,671,451 B1 * | 3/2014 | Lambert | H04W 12/08 | 380/270 |
| 9,036,509 B1 * | 5/2015 | Addepalli | H04W 4/046 | 370/259 |
| 2001/0016492 A1 * | 8/2001 | Igarashi | H04L 63/08 | 455/433 |
| 2002/0116523 A1 * | 8/2002 | Warrier | H04L 29/12009 | 709/238 |
| 2004/0101138 A1 * | 5/2004 | Revital | G06F 21/10 | 380/210 |
| 2004/0202329 A1 * | 10/2004 | Jung | H04L 63/0428 | 380/273 |
| 2006/0010321 A1 * | 1/2006 | Nakamura | H04L 29/06027 | 713/168 |
| 2006/0034461 A1 * | 2/2006 | Park | H04L 9/083 | 380/277 |
| 2006/0059342 A1 * | 3/2006 | Medvinsky | H04L 9/0822 | 713/168 |
| 2006/0139965 A1 * | 6/2006 | Gan | H02M 3/285 | 363/20 |
| 2006/0223518 A1 * | 10/2006 | Haney | H04W 4/21 | 455/420 |
| 2007/0001869 A1 * | 1/2007 | Hunzinger | G08G 1/092 | 340/903 |
| 2007/0189250 A1 * | 8/2007 | Haddad | H04L 63/0407 | 370/338 |
| 2007/0211720 A1 * | 9/2007 | Fuchs | H04L 12/1868 | 370/390 |
| 2007/0242829 A1 * | 10/2007 | Pedlow, Jr. | H04N 7/162 | 380/277 |
| 2007/0255784 A1 * | 11/2007 | Takechi | H04L 67/14 | 709/203 |
| 2007/0297379 A1 * | 12/2007 | Gorokhov | H04L 1/0045 | 370/338 |
| 2008/0026740 A1 * | 1/2008 | Netanel | G06Q 20/382 | 455/419 |
| 2008/0056216 A1 * | 3/2008 | Zimmerman | H04W 48/10 | 370/338 |
| 2008/0095128 A1 * | 4/2008 | Fong | H04L 12/66 | 370/338 |
| 2009/0138955 A1 * | 5/2009 | Vinayakray-Jani | H04L 63/062 | 726/12 |
| 2009/0238192 A1 * | 9/2009 | Dolganow | H04L 47/10 | 370/400 |
| 2010/0041373 A1 * | 2/2010 | Ramankutty | H04W 8/26 | 455/411 |
| 2010/0080202 A1 * | 4/2010 | Hanson | H04L 63/0853 | 370/338 |
| 2010/0080235 A1 * | 4/2010 | Yamate | H04L 45/00 | 370/395.31 |
| 2010/0122338 A1 * | 5/2010 | Kataoka | H04L 61/2015 | 726/12 |
| 2010/0318800 A1 * | 12/2010 | Simon | H04L 63/0428 | 713/171 |
| 2010/0325209 A1 * | 12/2010 | Thapa | H04L 45/00 | 709/204 |
| 2011/0078443 A1 * | 3/2011 | Greenstein | H04L 63/061 | 713/169 |
| 2011/0138178 A1 * | 6/2011 | Bajar | H04L 63/0428 | 713/168 |
| 2011/0150223 A1 * | 6/2011 | Qi | H04W 12/04 | 380/273 |
| 2011/0252169 A1 * | 10/2011 | Kilian | H04L 12/403 | 710/105 |
| 2011/0252230 A1 * | 10/2011 | Segre | H04L 63/162 | 713/155 |
| 2011/0282566 A1 * | 11/2011 | Kawauchi | G08G 1/161 | 701/117 |
| 2012/0011360 A1 * | 1/2012 | Engels | H04L 9/006 | 713/166 |
| 2013/0046821 A1 * | 2/2013 | Alanara | H04W 52/0216 | 709/204 |
| 2013/0128755 A1 * | 5/2013 | Ullah | G01S 5/02 | 370/252 |
| 2013/0145159 A1 * | 6/2013 | Nakaoka | H04L 9/08 | 713/161 |
| 2013/0163702 A1 * | 6/2013 | Higuchi | H04W 56/00 | 375/340 |
| 2013/0227689 A1 * | 8/2013 | Pietrowicz | G01R 1/20 | 726/23 |
| 2013/0318239 A1 * | 11/2013 | Scharf | H04L 69/16 | 709/224 |
| 2014/0015660 A1 * | 1/2014 | Ogusa | H04W 4/021 | 340/435 |
| 2014/0254477 A1 * | 9/2014 | Fricke | H04W 12/04 | 370/328 |
| 2017/0032402 A1 * | 2/2017 | Patsiokas | G06Q 30/0266 | |

FOREIGN PATENT DOCUMENTS

| | | | |
|---|---|---|---|
| DE | 102010033478 | 2/2012 | |
| DE | 102010033478 A1 * | 2/2012 | H04L 9/083 |

(56) References Cited

FOREIGN PATENT DOCUMENTS

WO      WO2009/158211      12/2009
WO      WO 2009158211 A2 *    12/2009    ......... G01C 21/3461

OTHER PUBLICATIONS

Erbas et al., "A Regular Path Recognition Method and Prediction of User Movements in Wireless Networks", 2001.*
Hoh et al., "Enhancing Security and Privacy in Traffic-Monitoring Systems", 2006.*
Hussain et al., "Towards Privacy Aware Pseudonymless Strategy for Avoiding Profile Generation in VANET", "Information Security Applications", 2009, pp. 268-280.*
Johnson et al., "Mobility Support in IPv6", RFC3775, 2004.*
Patra et al., "On street observations of particulate matter movement and dispersion due to traffic on an urban road", 2008.*
Plobl et al., "Towards a Security Achitecture for Vehicular Ad Hoc Networks", 2006.*
International Search Report for PCT/EP2014/055359, dated Jun. 20, 2014.

* cited by examiner

COMMUNICATION METHOD FOR TRANSMITTING USEFUL DATA AND CORRESPONDING COMMUNICATION SYSTEM

FIELD OF THE INVENTION

The present invention relates to a communication method for transmitting useful data between a first traffic participant, at least one second traffic participant, and a central communication device. The present invention further relates to a communication system.

BACKGROUND INFORMATION

From the existing art, communication methods are known by which useful data are transmitted between a plurality of traffic participants, for example the first traffic participant and the second traffic participant, preferably wirelessly. Such methods are referred to as "car to car," or C2C, communication methods. It is also known to transmit useful data from the traffic participant to the central communication device. In this case, reference is made to "car to infrastructure," or C2I, communication methods. As an umbrella concept covering these two methods, the expression "car to X," or C2X, communication methods can be used. For example, the first traffic participant and/or the second traffic participant are each a motor vehicle. In contrast, the central communication device is preferably stationary.

The quantity of data of the useful data that has to be transmitted between the first and the second traffic participant increases constantly, also because the number of parameters to be transmitted and/or the frequency of the transmission is constantly increasing. This holds in particular if a multiplicity of second traffic participants is present in the environment around the first traffic participant. In this case, the first traffic participant has to transmit the useful data to a plurality of second traffic participants, in particular to all the second traffic participants. This is frequently provided via the same interface or the same communication device.

In addition, the data transmission rate between the two traffic participants is standardly limited, while that between the respective traffic participant and the central communication device is preferably higher. This is also due to the fact that the communication connection between the traffic participants frequently changes; i.e. for example the first traffic participant has to set up the communication connection in alternating fashion respectively to one or more of the second traffic participants in order to transmit the data. The communication connection between the respective traffic participant, i.e. the first traffic participant or the second traffic participant, and the central communication device preferably exists, in contrast, over a longer period of time, in particular permanently during a period of operation of the respective traffic participant.

SUMMARY

The communication method has the advantage that the communication is improved between the first traffic participant, the at least one second traffic participant, and the central communication device. In particular, the quantity of data that is to be transmitted between the first traffic participant and the second traffic participant is significantly reduced, so that the available transmission capacity can be better exploited. This is achieved according to the present invention in that the first traffic participant provides a data packet and transmits it to the central communication device, the data packet being assigned to a changing key that is transmitted together with the data packet, and that the first traffic participant transmits an identifier together with the key to the second traffic participant, and that the second traffic participant requests from the central communication device, using the key, the data packet assigned to the key, and assigns it to the first traffic participant.

Thus, it is provided that at least a part of the useful data, in the form of the data packet, is no longer transmitted immediately between the first traffic participant and the second traffic participant, but rather is transmitted indirectly via the central communication device. This means that the data packet is transmitted from the first traffic participant to the central communication device, and subsequently from the central communication device to the at least one second traffic participant. In this way, the preferably higher data transmission rate between the respective traffic participant and the central communication device can advantageously be exploited. It is also true that the useful data no longer have to be transmitted from the first traffic participant to each second traffic participant, i.e. multiple times under some circumstances. Instead, there takes place only a single transmission to the central communication device.

However, without additional precautions, today the problem occurs that the data packet is known to the central communication device, and can additionally be assigned to the first traffic participant. If for example the data packet contains the position of the first traffic participant or a comparable data set, then a profile of the first traffic participant, in particular a movement profile, can be created by the second communication device. Such a profile or movement profile can then be used in an impermissible manner, in particular in a way that is not compatible with data protection.

In order to prevent this, the data packet should be transmitted together with the key to the central communication device. The key is realized in a changing manner, and therefore does not permit the first traffic participant to be inferred. Preferably, each data packet transmitted from the first traffic participant to the central communication device is provided with a key that is different from at least the key last used by the first traffic participant. Particularly preferably, the key is at least different from each of the keys used during a particular immediately preceding time span. Quite particularly preferably, the key can be selected to be different from all keys previously used by the first traffic participant. In this way, the data packet is transmitted to the central communication device, but this device cannot relate the data packet to the first traffic participant.

Thus, overall the central communication device has a multiplicity of data packets. However, even during an evaluation it is possible to infer only the presence of a motor vehicle, for example at a particular position. However, no curve, for example no position curve, over time can be determined and evaluated.

At the same time, however, it is still necessary to reliably transmit the data packet to the at least one second traffic participant and to unambiguously assign it to the second traffic participant. The key is provided for this purpose. This key is transmitted from the first traffic participant to the second traffic participant together with the identifier, which preferably unambiguously identifies the first traffic participant, i.e. is constant, regarded over time. The second traffic participant therefore has the combination of identifier and key. Correspondingly, the first traffic participant, in particular each second traffic participant, can set up a communication connection to the central communication device and, using the key, can request the data packet of the first traffic participant.

This means that the second traffic participant transmits the key to the central communication device together with a request for the corresponding data packet. Subsequently, the central communication device determines the data packet assigned to the key and transmits it to the second traffic participant, for example using a corresponding database. The second traffic participant can now assign the data packet to the first traffic participant because, as explained above, it has the identifier as well as the key. The identifier can for example be selected to be constant and unambiguous. Particularly advantageously, each identifier is assigned only once and is fixedly assigned to the first traffic participant. Thus, this traffic participant can be unambiguously identified, for example worldwide, on the basis of the identifier.

In contrast, the key is selected such that even given a large number of first traffic participants standing in communicative connection with the central communication device, no overlap can occur of the keys used by the first traffic participants. For this purpose, the key preferably has a corresponding length, in particular at least 32 bits, at least 64 bits, or at least 128 bits. For example, the key is determined by combining a changing value with the identifier as salt, and determining the key from the combination of the two quantities using a hash function.

In addition or alternatively, it can also be provided that a key is determined arbitrarily, for example randomly, and is first transmitted to the central communication device in the context of a collision query. The central communication device then checks whether the key is already in use, and makes a corresponding response to the first traffic participant. If the response indicates an already-assigned key, the first traffic participant then selects a new key differing from the previously selected key. The method then begins again. If the response indicates that the key is not in use, the key is transmitted together with the data packet from the first traffic participant to the central communication device.

The central communication device is preferably made such that it has a database in which each key and the associated data packet is stored. Particularly preferably, in addition a duration of validity is linked with the key. This duration of validity begins with the transmission of the data packet and the key to the central communication device. After the validity duration has expired, the key and data packet are erased, for example from the database. The key is then available to be used again. Of course, the data packet linked with the key can also be additionally stored by the central communication device, in particular for statistical evaluation.

Using the communication method described above, the efficiency of the communication connection can be significantly increased, in particular because the preferably different communication paths between the first traffic participant and the second traffic participant on the one hand, and between the first traffic participant and the central communication device on the other hand, are advantageously used. The data transmission between the first traffic participant and the second traffic participant, between the first traffic participant and the central communication device, and/or between the central communication device and the second traffic participant, can take place encrypted or unencrypted.

In an advantageous embodiment of the present invention, it is provided that the key changes randomly or at determined time intervals. As explained above, the key can of course be chosen to be different for each data packet. However, alternatively it can also be randomly changed, so that for example a new key is generated after the expiration of a random time span. Alternatively, the key can be valid only in each of the determined time intervals, and can be differently selected for successive time intervals, in particular immediately successive time intervals.

A development of the present invention provides that the data packet has at least one data set, in particular a timestamp, at least one operating variable, and/or the position of the first traffic participant. The data packet includes the one data set or a plurality of such data sets. Each data set has for example the operating variable and/or the position of the first traffic participant. In addition, the timestamp can be assigned to the data set that designates the time of the presence of the operating variable, or of the position. In this way, even in the case of asynchronous transmission of the data packet from the first traffic participant to the central communication device, the time at which the operating variable or the position was present can be precisely determined.

The timestamp is for example determined using a time acquisition device that is synchronized with a time acquisition device of the central communication device. The operating variable is for example a state quantity of the first traffic participant, i.e. in particular the position, the speed, the direction of travel, and the like. However, it can also provide information about other quantities of the first traffic participant.

A further advantageous embodiment of the present invention provides that the central communication device evaluates the data set, in particular the operating variable, and transmits an evaluation result obtained in this way to the at least one second traffic participant, in particular together with the data packet. Even if the central communication device does not have the identifier, and thus cannot assign the data set to the first traffic participant, an evaluation of the data set can nonetheless be carried out. This is the case in particular when the data set has the operating variable, for example the position or the speed of the first traffic participant. Thus, from the position or speed a traffic density in the region of the likewise transmitted position can be inferred.

For example, the central communication device can evaluate in this way all data packets transmitted to it by a plurality of first traffic participants, and in this way can carry out a comprehensive evaluation of the traffic density via the positions of the plurality of first traffic participants. The result of this evaluation can be made available, for example in the form of a traffic density map, to the traffic participants, i.e. both to the first traffic participant and also to the at least one second traffic participant, in particular if this information is requested from the central communication device by the respective traffic participant. The result of the evaluation is thus communicated to the second traffic participants. This can be done particularly efficiently together with the data packet.

A further advantageous embodiment of the present invention provides that the evaluation includes a map adaptation. This is also referred to as map matching or map compensation. In the context of the map matching, the position of the first traffic participant, contained under some circumstances in the data set, is compared with the location information of a digitally present map. In this way, for example imprecisions in the determined position can be corrected. In the context of the map matching, the probable coordinates within the digital map are thus inferred for example on the basis of the transmitted position.

In the ideal case, the coordinates and the determined position agree with one another. However, because the determination of the position standardly has imprecision, and the digital map also has tolerances, the map matching can be provided in order to correct the transmitted position. The map matching is carried out in a known manner. Particularly preferably, the position of the first traffic participant, contained in the data packet or data set, is corrected, and to this extent the coordinates are incorporated, instead of the position, in the data packet or data set. The at least one second traffic participant thus receives the corrected position already with the transmission of the data packet.

A development of the present invention provides that the second traffic participant uses the data packet assigned to the first traffic participant to create a movement profile of the first traffic participant. While the creation of the movement profile by the central communication device is standardly not permissible for reasons of data protection, it is necessary for the second traffic participant, in particular in order to react to the first traffic participant in an appropriate manner. For example, on the basis of the movement profile, i.e. the curve of the position of the first traffic participant over time, it is inferred whether there is a risk of collision, and how great the probability of such a collision is. For this purpose, for example on the basis of the existing movement profile a projection or extrapolation of the expected position curve is created.

The evaluation of the data packet and the creation of the movement profile by the second traffic participant is unproblematic in particular when the first traffic participant transmits the identifier and the key to the second traffic participant only when there is a distance between the first traffic participant and the second traffic participant that is smaller than a specified distance. Ideally, the movement profile of the first traffic participant is deleted by the second traffic participant as soon as the identifier and the key have no longer been received over a specified span of time.

A further embodiment of the present invention provides that the key is transmitted from the first traffic participant to the second traffic participant immediately or via a further central communication device. Of course, the first variant, in which the key is transmitted immediately between the traffic participants, is particularly advantageous for reasons of data protection. Here, immediate transmission is to be understood as meaning that no intermediate station, i.e. a reception and renewed sending out, is provided in the data transmission. Rather, the data sent out by the first traffic participant are received immediately by the second traffic participant in the form of the identifier and the key. Alternatively, the transmission of the key takes place indirectly, in particular via the further central communication device.

Because the further central communication device is different from the communication device that has the data packet, it is in addition not possible for the central communication device to produce a movement profile of the first traffic participant. Nonetheless, corresponding precautions are to be taken to ensure data protection. This includes for example a limitation of querying of the key, identifier, and data packet by the second traffic participant, so that it is not the case that arbitrary sites can access these data and could thus produce a movement profile. This can for example be ensured in that the further central communication device permits only a specified number of queries or requests per second traffic participant, in particular also per time unit.

A further embodiment of the present invention provides that the transmission from the first traffic participant to the second traffic participant takes place via a first communication path and the transmission to the central communication device takes place via a second communication path differing from the first communication path. The communication paths between the first traffic participant and the second traffic participant on the one hand and the first traffic participant and the central communication device on the other hand are therefore preferably different from one another. In particular, the first communication path has a smaller range than the second communication path. Preferably, the first communication path is realized via a short-range communication device, for example a WLAN communication device, and/or the second communication path is realized via a long-range communication device, for example a mobile radiotelephone communication device.

The present invention also relates to a communication system for transmitting useful data, in particular for carrying out the communication method described above. The communication system has a first traffic participant, at least one second traffic participant, and a central communication device. The first traffic participant is fashioned to provide a data packet and to transmit it to the central communication device, the data packet being assigned to a changing key that is transmitted together with the data packet. In addition, the first traffic participant is fashioned to transmit an identifier together with the key to the second traffic participant. Finally, the second traffic participant is to be fashioned to request from the central communication device, using the key, the data packet assigned to the key and to assign it to the first traffic participant. The advantages of such a communication system, or of the corresponding procedure, have already been indicated. The communication system and the corresponding communication method can be developed as explained above, so that reference is made thereto.

DETAILED DESCRIPTION

Figure 1:
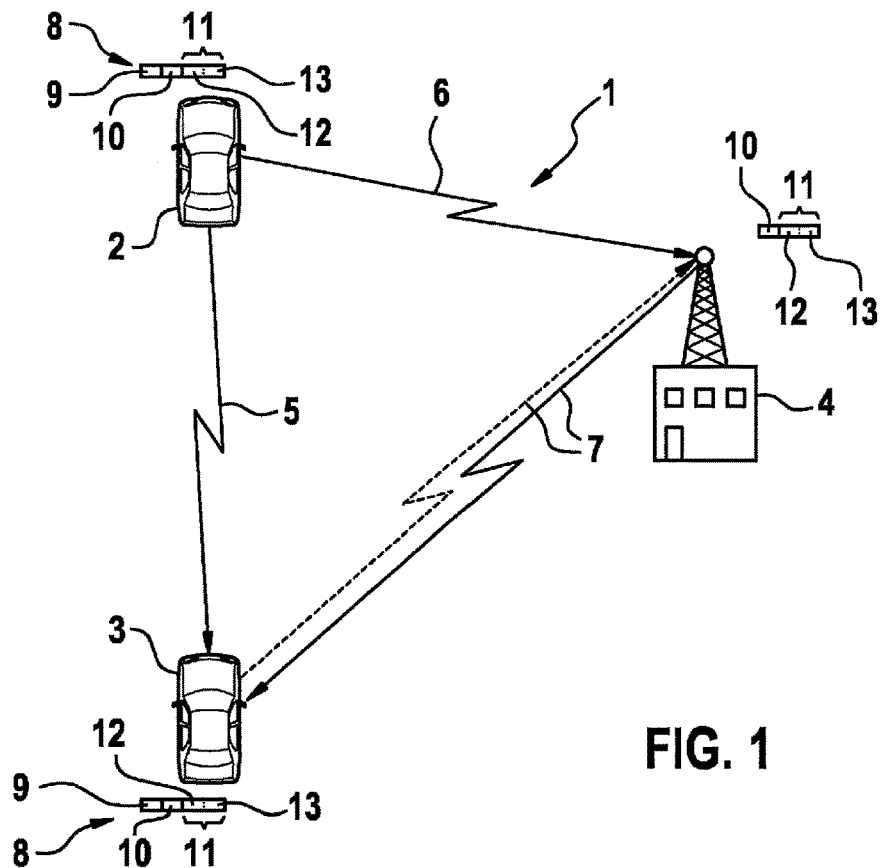
FIG. 1 shows a communication system in a first specific embodiment.

FIG. 1 shows a communication system 1 in a first specific embodiment. Communication system 1 has a first traffic participant 2, for example a motor vehicle, at least one second traffic participant 3, for example also a motor vehicle, and a central communication device 4. Communication system 1 is used for the transmission of useful data between traffic participants 2 and 3 and communication device 4. For this purpose, a first communication path 5 is present between first traffic participant 2 and second traffic participant 3, while first traffic participant 2 can communicate with central communication device 4 via a second communication path 6. A third communication path 7 exists between second traffic participant 3 and central communication device 4. In the exemplary embodiment shown here, communication paths 5 and 6 are unidirectional, while third communication path 7 is bidirectional. Of course, however, first traffic participant 2 can simultaneously occur as second traffic participant 3, so that in particular in this case communication paths 5 and 6 can also be bidirectional.

First traffic participant 2 now assembles data 8, shown only as an example. Data 8 are made up of an identifier 9, a key 10, and useful data in the form of a data packet 11. In data packet 11 there is for example a data set made up of a timestamp 12 and the momentary position 13 of first traffic participant 2. Data packet 11 is assigned to key 10, which changes at least from time to time. It can also be provided that a new key is assigned to each new data packet 11. While key 10 therefore changes, identifier 9 is constant and is preferably unambiguously assigned to first traffic participant 2. Key 10, with data packet 11 assigned to it, is now transmitted to central communication device 4 via second communication path 6. In a preferred embodiment, this is not true for identifier 9; i.e., this identifier is not provided to central communication device 4 via second communication path 6.

In addition, key 10 is now transmitted together with identifier 9 to second traffic participant 3 via first communication path 5. Thus, while key 10 and data packet 11 are present in central communication device 4, second traffic participant 3 has key 10 and identifier 9. It is now provided that second traffic participant 3 requests data packet 11 from central communication device 4. Thus, data packet 11 is not transmitted via first communication path 5, but rather via third communication path 7. The key, which preferably unambiguously identifies data packet 11, is used for this purpose.

Via third communication path 7, key 10 is provided to central communication device 4, and simultaneously data packet 11 linked with the key is requested. Central communication device 4 now determines the data packet 11 that matches key 10 and again transmits this to second traffic participant 3 via third communication path 7.

The second traffic participant can now unambiguously assign data packet 11 to first traffic participant 2, because the second traffic participant has identifier 9, key 10, and data packet 11. On the basis of data 8, second traffic participant 3 can create a movement profile of first traffic participant 2 and can use it for example for a driver assistance device, in particular collision recognition or the like.

Figure 2:
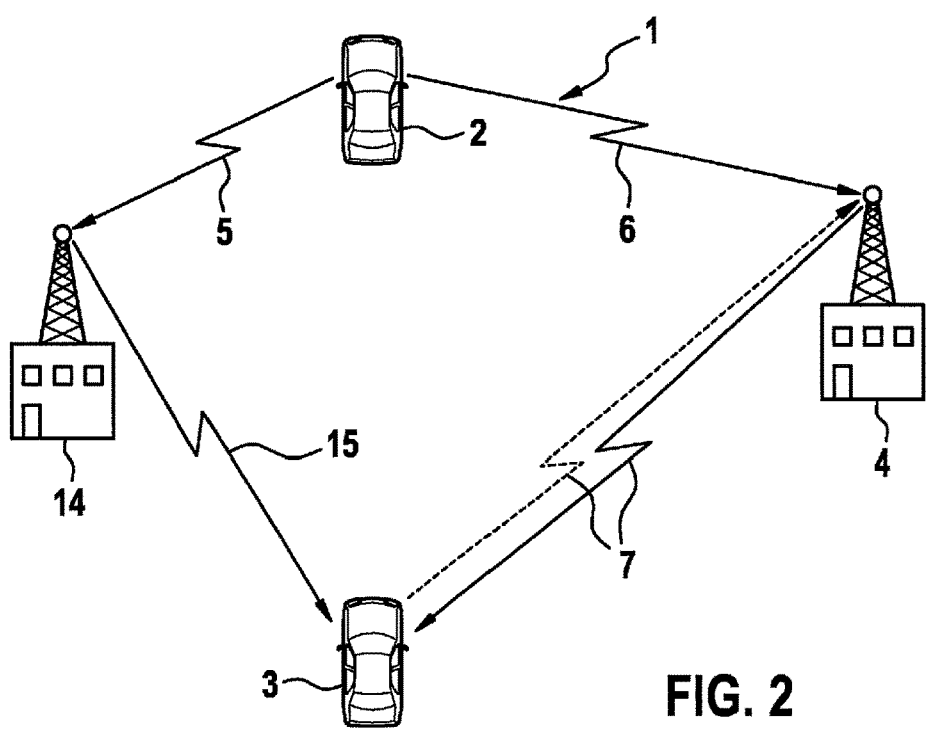
FIG. 2 shows the communication system in a second specific embodiment.

FIG. 2 shows a second specific embodiment of communication system 1. Here, again first traffic participant 2, second traffic participant 3, and central communication device 4 are present. To this extent, reference is made to the explanations given above. In addition, however, here there is a further central communication device 14. First communication path 5 is provided between first traffic participant 2 and this further central communication device 14. A fourth communication path 15, for example fashioned analogously to first communication path 5, is present between communication device 14 and second traffic participant 3. With regard to the transmission of key 10 and of data packet 11 from first traffic participant 2 to central communication device 4, reference is made to the above explanations. Likewise, nothing is different regarding the request of data packet 11 from communication device 2 by second traffic participant 3 using key 10.

The difference from the first specific embodiment described above is that identifier 9 together with key 10 is not transmitted immediately from first traffic participant 2 to second traffic participant 3. Rather, this transmission is realized indirectly, namely via further communication device 14. This means that identifier 9 and key 10 are transmitted via first communication path 5 from first traffic participant 2 to further central communication device 14. Subsequently, this communication device transmits identifier 9 and key 10 to second traffic participant 3. Of course, it can be provided that communication device 14 corresponds to communication device 4, or at least is a component thereof. Particularly preferably, however, it is present separately from communication device 4.

For example, communication paths 5 and 15 are produced via a short-range communication device, while communication paths 6 and 7 are preferably realized via a long-range communication device.

What is claimed is:

1. A communication method for transmitting useful data between a first traffic participant, at least one second traffic participant, and a central communication device, comprising:
generating, by the first traffic participant, a data packet;
assigning, by the first traffic participant, the data packet to a changing key;
transmitting, by the first traffic participant, the key together with the assigned data packet to the central communication device;
transmitting, by the first traffic participant, an identifier together with the key to the second traffic participant, the identifier being associated with the first traffic participant;
requesting, from the central communication device by the second traffic participant, using the key, the data packet assigned to the key;
receiving, from the central communication device by the second traffic participant, the data packet assigned to the key; and
assigning, by the second traffic participant, the received data packet to the first traffic participant, and creating, by the second traffic participant, a movement profile of the first participant, using the assigned received data packet.

2. The communication method as recited in claim 1, wherein the key changes randomly or at particular time intervals.

3. The communication method as recited in claim 1, wherein the data packet has at least one data set.

4. The communication method as recited in claim 3, wherein the at least one data set includes a timestamp and at least one of at least one operating variable and a position of the first traffic participant.

5. The communication method as recited in claim 4, further comprising:
evaluating, by the central communication device, the data set; and
transmitting, by the central communication device, an evaluation result thus obtained to the at least one second traffic participant.

6. The communication method as recited in claim 5, wherein the evaluation result is transmitted with the data packet, and the central communication device evaluates at least one of the operating variable and the position.

7. The communication method as recited in claim 5, wherein the evaluating includes a map matching.

8. The communication method as recited in claim 1, wherein the identifier is transmitted from the first traffic participant to the second traffic participant one of immediately and via a further central communication device.

9. The communication method as recited in claim 1, wherein the transmission from the first traffic participant to the second traffic participant takes place via a first communication path, and the transmission to the central communication device takes place via a second communication path different from the first communication path.

10. The communication method as recited in claim 9, wherein the first communication path is produced via a short-range communication device, and the second communication path is produced via a long-range communication device.

11. A communication system for transmitting useful data, comprising:
- a first traffic participant;
- at least one second traffic participant; and
- a central communication device, wherein:
  - the first traffic participant generates a data packet,
  - the data packet is assigned, by the first traffic participate, to a changing key;
  - the first traffic participant transmits the key together with the assigned data packet to the central communication device,
  - the first traffic participant transmits an identifier together with the key to the second traffic participant, the identifier being associated with the first traffic participant, and
  - the second traffic participant (i) requests, using the key, the data packet assigned to the key from the central communication device, (ii) receives the data packet assigned to the key from the central communication device, (iii) assigns the received data packet to the first traffic participant, and (iv) creates a movement profile of the first participant, using the assigned received data packet.

* * * * *